United States Patent [19]

McGuire

[11] Patent Number: 5,992,730
[45] Date of Patent: Nov. 30, 1999

[54] METHOD FOR ASSEMBLING A TROLLEY FOR AN OVERHEAD TRAVELING CRANE

[75] Inventor: Darrel McGuire, Greenfield, Wis.

[73] Assignee: MHE Technologies, Inc., Wilmington, Del.

[21] Appl. No.: 09/008,147

[22] Filed: Jan. 16, 1998

[51] Int. Cl.[6] .......................... B23K 31/02; B23K 39/00; B23K 5/22; B61D 1/00; B23P 21/00

[52] U.S. Cl. .......................... 228/178; 228/182; 228/212; 105/163.1; 29/464; 29/469; 198/465.1; 198/465.4

[58] Field of Search .................................. 228/175, 178, 228/182, 212; 105/163.1; 198/465.1, 465.4; 29/464, 469, 897.2

[56] References Cited

U.S. PATENT DOCUMENTS

| | | | |
|---|---|---|---|
| 3,673,675 | 7/1972 | Eggert, Jr. ................................. | 29/469 |
| 4,360,304 | 11/1982 | Brewer et al. ........................... | 414/191 |
| 4,385,562 | 5/1983 | Bitsch et al. ........................ | 105/163 R |
| 4,491,201 | 1/1985 | Mountz ...................................... | 188/42 |
| 5,161,730 | 11/1992 | McGuire et al. ........................ | 228/182 |

OTHER PUBLICATIONS

The Welding Handbook, Eighth Edition, p. 571, 1987.

*Primary Examiner*—Patrick Ryan
*Assistant Examiner*—Kiley Stoner
*Attorney, Agent, or Firm*—Michael Best & Friedrich LLP

[57] ABSTRACT

A trolley having an inner assembly and trolley sides is assembled by placing the components of the inner assembly in a welding fixture, welding the inner assembly components together, and welding the inner assembly to the trolley sides. The use of the fixture and the order in which the welds are carried out minimize distortion in the assembled trolley.

9 Claims, 9 Drawing Sheets

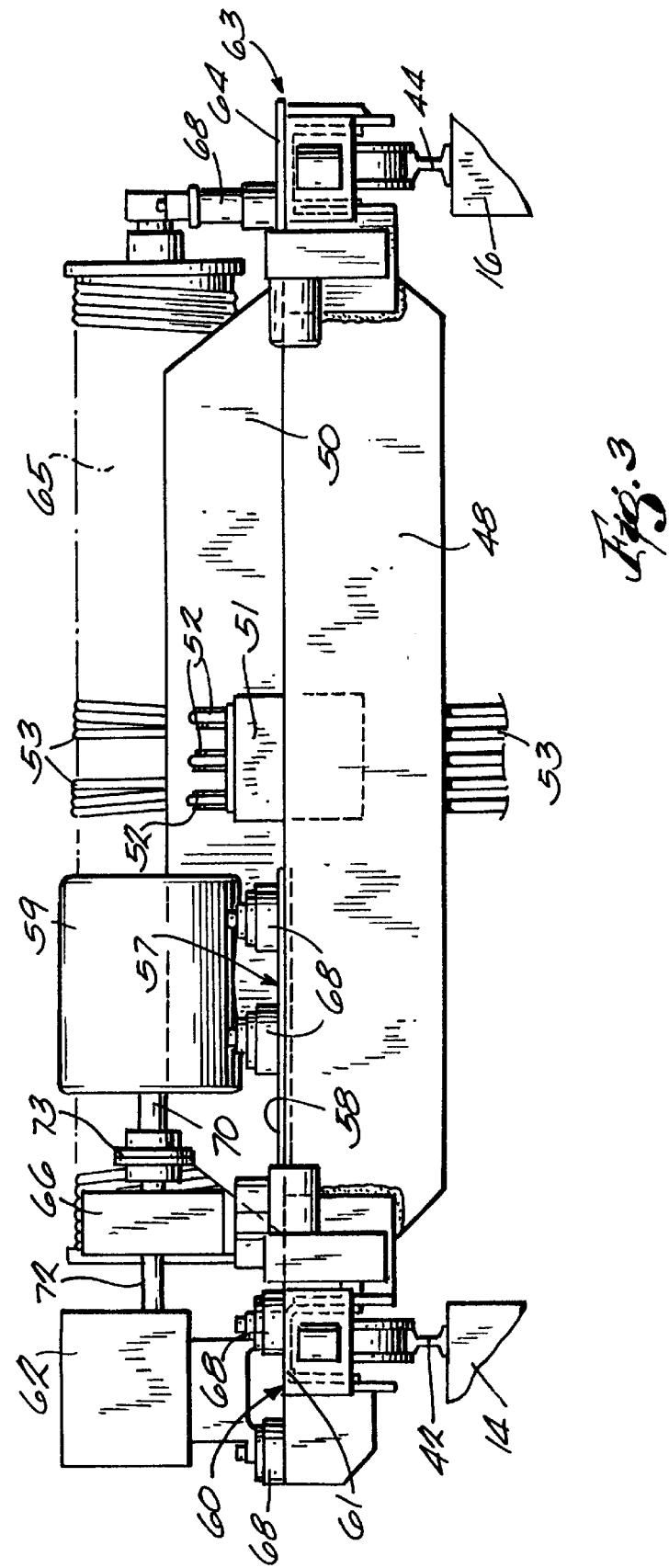

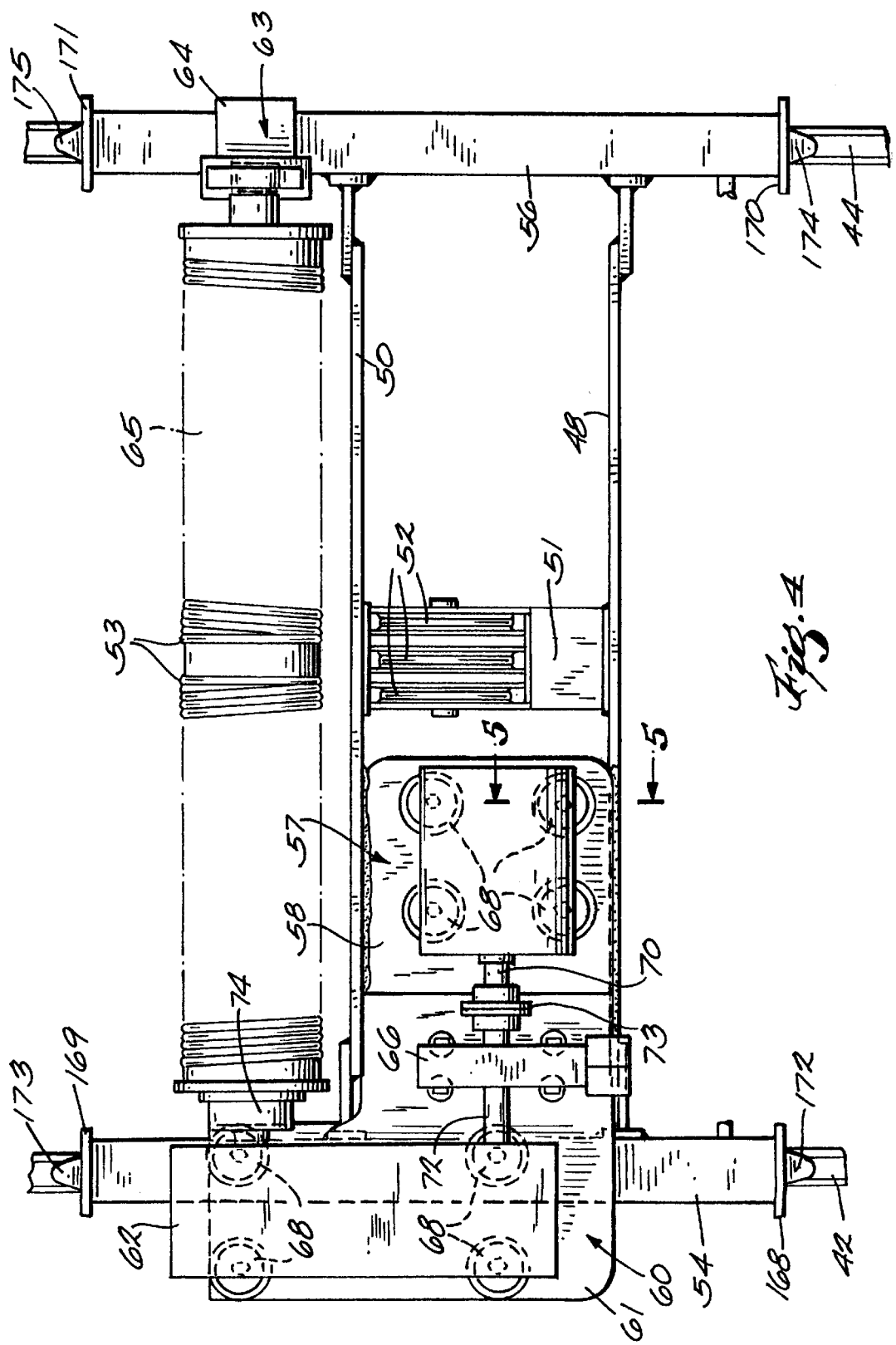

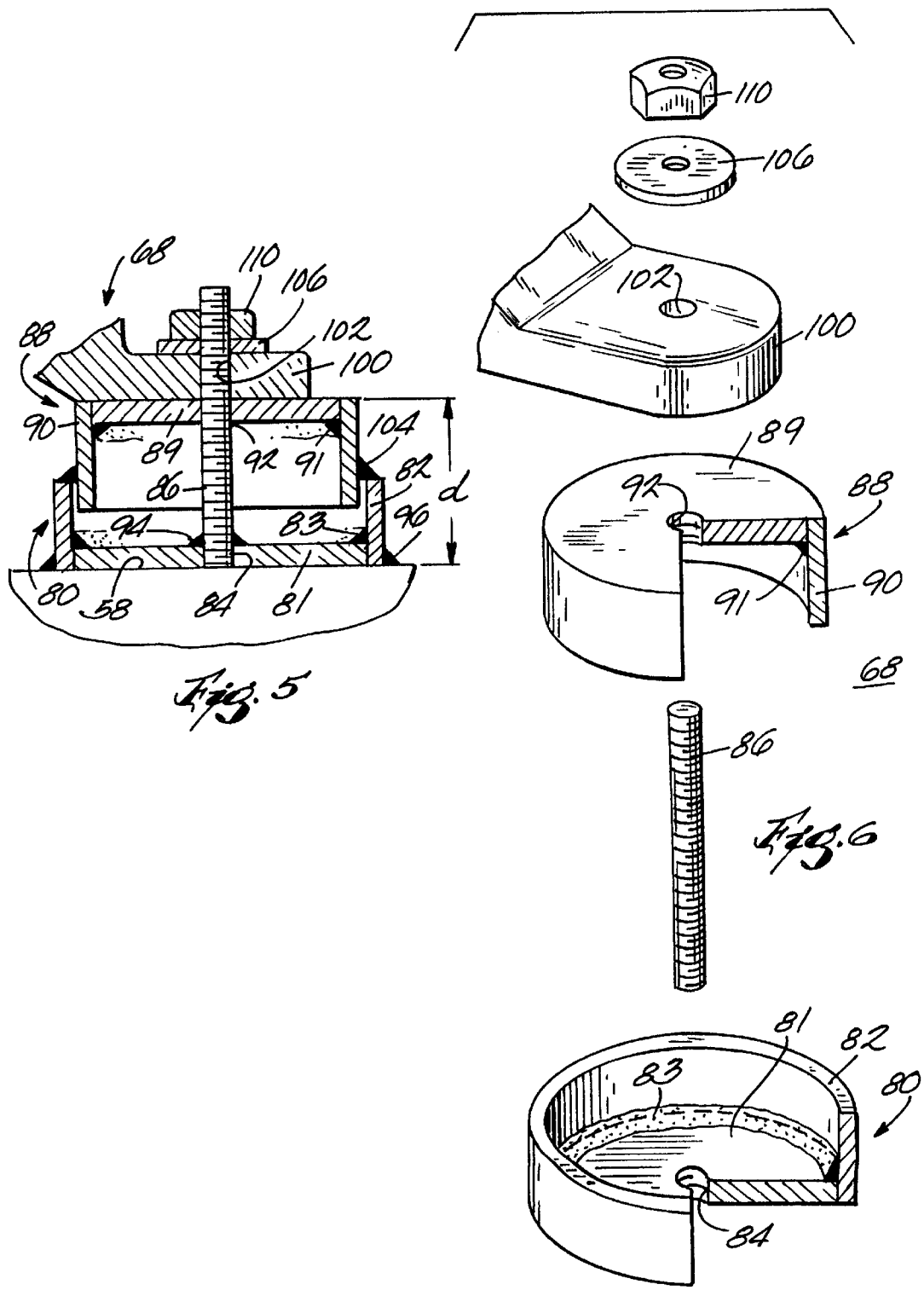

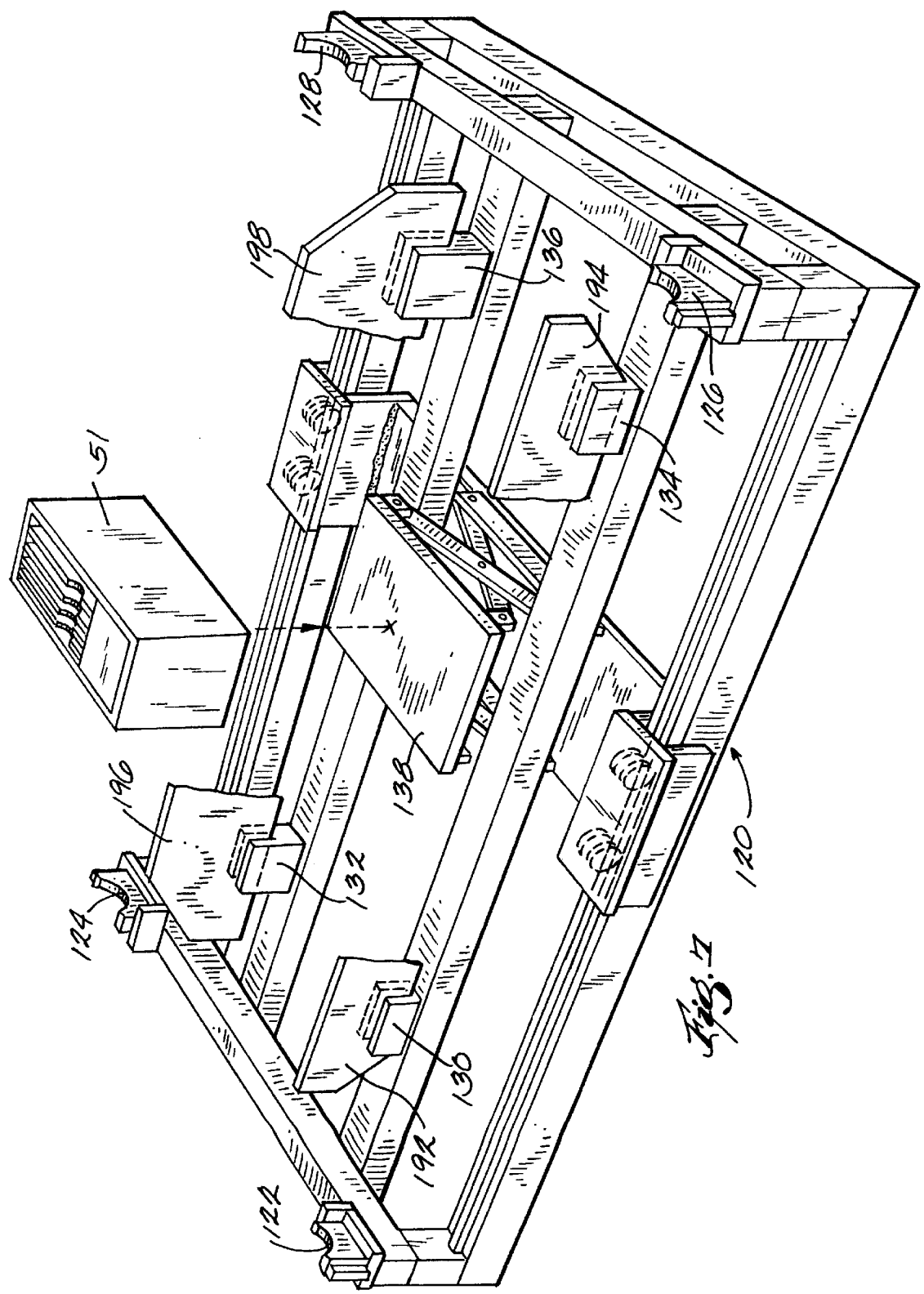

METHOD FOR ASSEMBLING A TROLLEY FOR AN OVERHEAD TRAVELING CRANE

FIELD OF THE INVENTION

The invention relates to overhead traveling cranes. More particularly, the invention relates to a method for assembling a trolley for an overhead traveling crane.

BACKGROUND OF THE INVENTION

An overhead traveling crane typically includes generally parallel trucks that run on rails, and a trolley that travels on tracks running between and generally perpendicular to the trucks.

The trolley also usually includes generally parallel trolley sides having wheel shoes to which wheels are connected. The wheels should be aligned with the tracks on which they ride to reduce wear on the wheels. The wheels should also be co-planar to ensure all wheels simultaneously contact the rails.

The trolley also includes mounted objects, such as a motor, a gear case, and a drum or cylinder, which are mounted on generally horizontal support surfaces of support plates. The support surfaces should be substantially level to allow proper mounting of the mounted objects.

A trolley is typically assembled by welding various trolley components together. Welding often causes distortion in the trolley components. Distortion can cause the wheels to be misaligned with the tracks on which they ride, and can also warp the support plates, causing uneven support surfaces.

In a typical overhead traveling crane, the support surfaces and wheel shoes must be machined after trolley assembly to ensure the wheels will be properly level and aligned with the tracks on which they ride when the wheels are connected to the wheel shoes, and to provide a substantially level support surface for the mounted objects. Machining support surfaces and wheel shoes is a time consuming, expensive, and arduous task.

SUMMARY OF THE INVENTION

The invention provides a method for assembling a trolley for an overhead traveling crane, which method eliminates the need for after-assembly machining of support surfaces and the need for wheel shoes. Preferably, the method for assembling a trolley includes the steps of: providing a fixture into which components of the trolley are placed prior to welding, the fixture having co-planar wheel cradles; setting wheel assemblies in the cradles; joining the wheel assemblies to trolley sides; placing front and rear girt plates into the fixture between and substantially perpendicular to the trolley sides; welding an upper block or sheave frame to the front and rear girt plates, thereby forming an inner assembly; and welding the inner assembly to the trolley sides in a manner that minimizes distortion and allows each wheel to remain substantially co-planar with the other wheels and in line with the track on which it rides.

Due to the use of the fixture, the accuracy of the welds, and the order in which the welds are applied, the preferred method for assembling a trolley results in substantially level support surfaces and wheels that are properly aligned with the tracks on which they ride. Because the method for assembling a trolley provides substantially level support surfaces, objects can be mounted on the support surfaces without first machining the support surfaces. Also, because the method for assembling a trolley provides properly aligned wheels, wheel shoes are not needed, and there is no need to machine the surface to which the wheels are attached.

It is a feature and advantage of the present invention to provide a method for assembling a trolley for an overhead traveling crane, which method reduces distortion caused by welding.

It is a feature and advantage of the present invention to provide a method for assembling a trolley for an overhead traveling crane, which method eliminates the need for after-assembly machining of trolley support surfaces and the need for wheel shoes.

These and other features and advantages of the present invention will be apparent to those skilled in the art with the following detailed description, claims, and drawings.

BRIEF DESCRIPTION OF THE DRAWINGS

FIG. 3 is a front view of the trolley of FIG. 2.

FIG. 4 is a top view of the trolley of FIG. 2.

FIG. 5 is a sectional view of a mounting pad taken along line 5—5 in FIG. 4.

FIG. 7 is a perspective view of a fixture used to assemble the trolley.

FIG. 8 is an exploded perspective view of the trolley prior to assembly.

Figure 1:
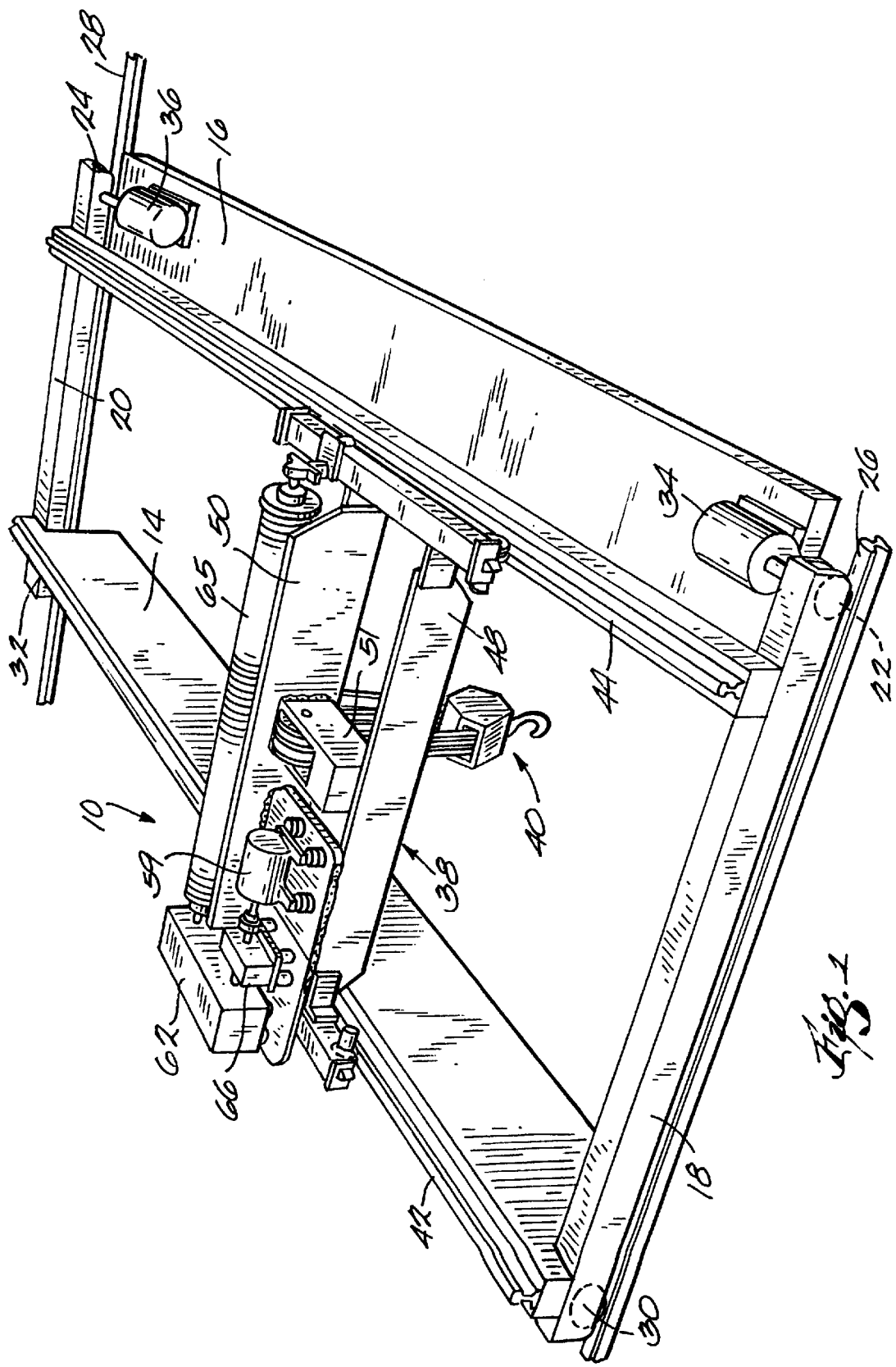
FIG. 1 is a perspective view of an overhead traveling crane embodying the invention.

Before one embodiment of the invention is explained in detail, it is to be understood that the invention is not limited in its application to the details of the construction and arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

FIG. 1 illustrates an overhead traveling crane 10 embodying the invention. The crane 10 comprises a pair of bridge cross-members 14, 16 and trucks 18, 20 at opposite ends of the cross-members 14, 16. Drive wheels 22, 24 are respectively rotatably mounted on the trucks 18, 20 in engagement with rails 26, 28 so that the rails 26, 28 support the crane 10. Additional non-driven or idler wheels 30, 32 are respectively rotatably mounted on the trucks 18, 20 in engagement with the rails 26, 28 for further support of the crane 10. The rails 26, 28 are mounted on conventional beams (not shown) or other suitable foundation means. The engagement of the drive and idler wheels 22, 24, 30, 32 with the rails 26, 28 permits travel of the crane 10 along the rails 26, 28. Motors 34, 36 are mounted on the bridge cross-member 16 and drive the wheels 22, 24 respectively.

The crane 10 also includes a trolley 38; the trolley 38 is best illustrated in FIGS. 1–4. The trolley 38 has a material handling hook 40 and is supported for travel on tracks 42, 44, which are respectively mounted on the cross-members 14, 16 of the crane 10.

Figure 2:
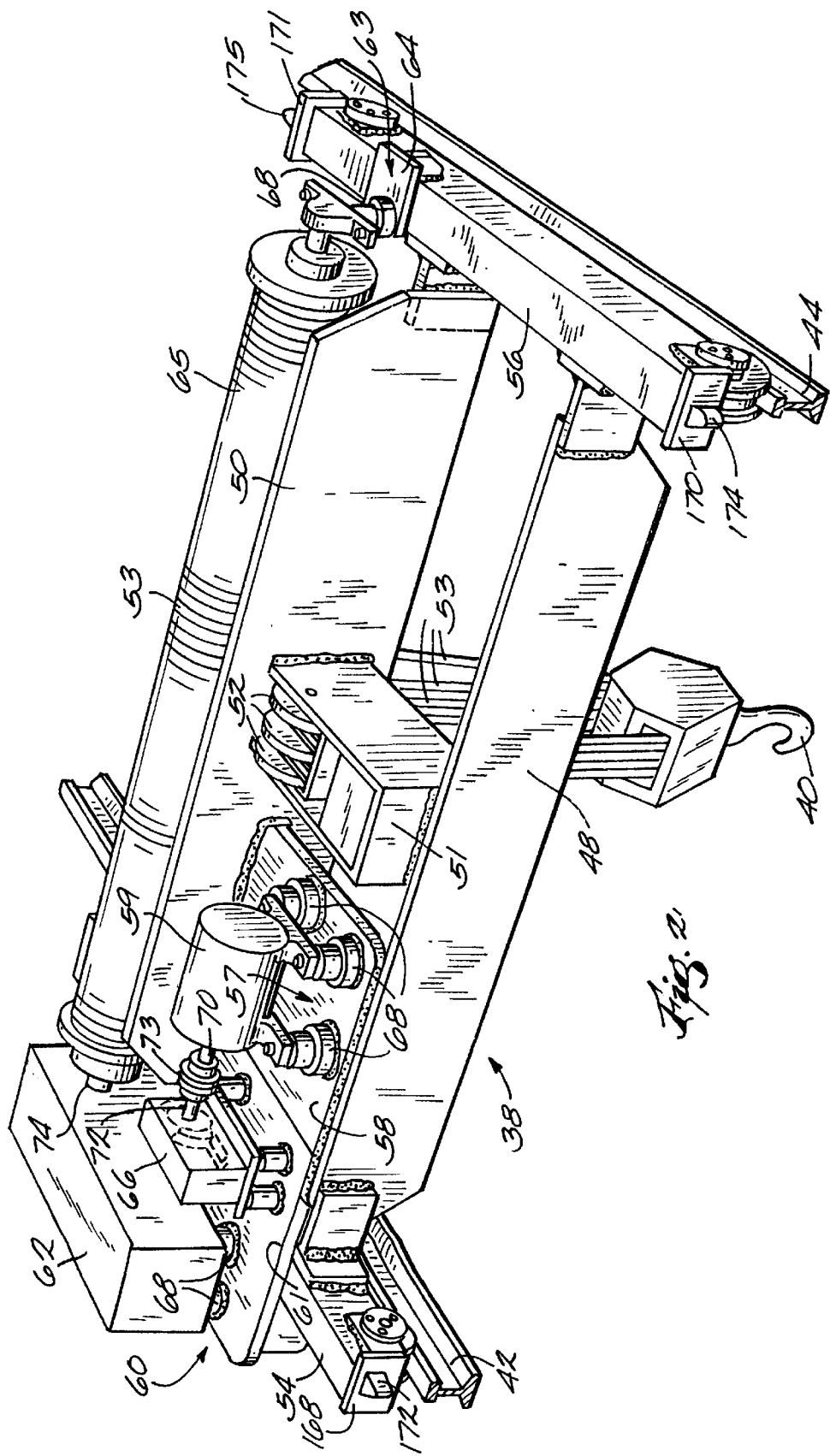
FIG. 2 is a perspective view of the trolley of the overhead traveling crane of FIG. 1.

The trolley 38 includes an inner assembly, which includes a front girt plate 48, a rear girt plate 50, and an upper block 51. The girt plates 48, 50 are generally vertical, and the upper block 51 is positioned between the girt plates 48, 50. As seen in FIGS. 2–4, the upper block 51 houses several sheaves 52. A rope 53 is fed through the sheaves 52 and then through the hook 40 in a conventional manner to allow for raising and lowering of the hook 40 during operation of the crane 10, as explained below. The trolley 38 further comprises generally parallel first and second trolley sides 54, 56 connected to the girt plates 48, 50.

As seen in FIG. 2, the trolley 38 includes a motor base plate 57 having a generally horizontal support surface 58 for supporting a motor 59. The trolley 38 also includes a gear case base plate 60 having a generally horizontal support surface 61 for supporting a gear case 62. The trolley 38 also includes a drum base plate 63 having a generally horizontal support surface 64 for supporting an end of a drum or cylinder 65. The base plates 57, 60, 63 are attached to the rest of the trolley 38 after the inner assembly has been joined to the trolley sides as described below. Positioned between the motor 59 and the gear case 62 is a brake 66, which is mounted on support surface 61 and is described below.

Referring to FIGS. 2–4, the motor 59, the gear case 62, and the drum 65 are mounted on mounting pads 68. The mounting pads 68 allow adjustment of the height of the motor 59, the gear case 62, and the drum 65 as explained below. The motor 59 includes a power take-off shaft 70, and the gear case 62 includes an input shaft 72 coupled to the power take-off shaft 70 with a conventional coupler 73. The brake 66 selectively acts on the input shaft 72 in a conventional manner. The gear case 62 also has an output shaft 74 connected to the drum 65.

During operation, the motor 59 rotates the power take-off shaft 70, thereby rotating the input shaft 72 through the coupling action of the coupler 73. Rotation of the input shaft 72 causes rotation of a series of gears (not shown) in the gear case 62 in a conventional manner, which causes the output shaft 74 to rotate at a rotational speed less than the rotational speed of the power take-off shaft 70. The output shaft 74 causes rotation of the drum 65. Rotation of the drum 65 causes the drum 65 to wind or unwind the rope 53, and the rope 53 moves through the sheaves 52, causing the hook 40 to move up and down in a conventional manner.

As seen in FIG. 3, mounting pads 68 are used to adjust the height of the motor 59 and the gear case 62 to level the power take-off shaft 70 and the input shaft 72 with respect to each other. A mounting pad 68, positioned at the end of the drum 65 opposite the end connected to the output shaft 74 (not seen in FIG. 3), is used to level the drum 65.

Figure 6:
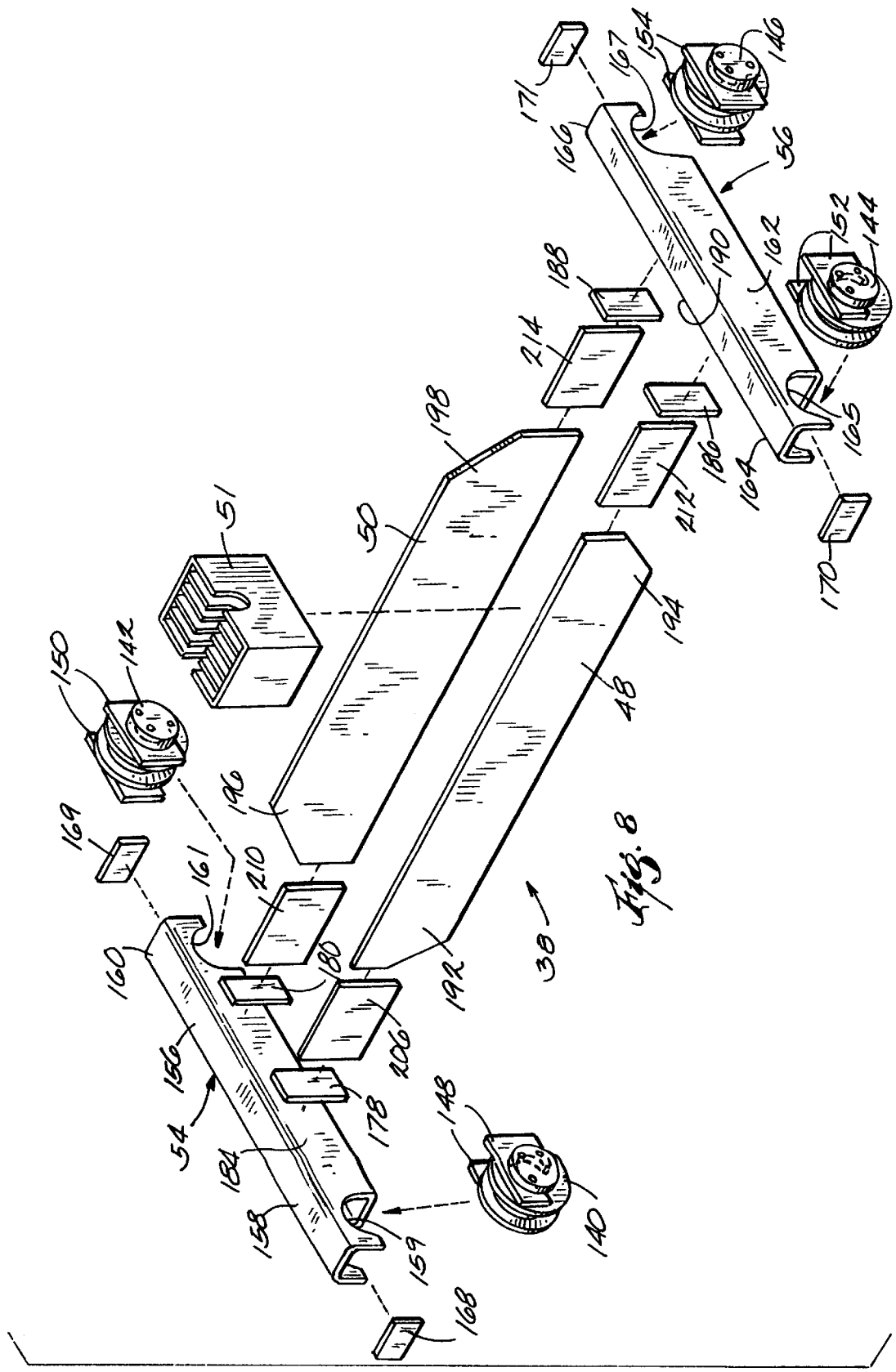
FIG. 6 is an exploded perspective view of the mounting pad illustrated in FIG. 5, with portions cut away for the purpose of illustration.

FIGS. 5 and 6 best illustrate a mounting pad 68 used to mount an object, such as the motor 59, a desired distance d from a support surface, such as the surface 58. The mounting pad 68 illustrated in FIGS. 5 and 6 is representative of the mounting pads 68 on which the gear case 62 and the drum 65 are mounted. The mounting pad 68 includes a base member 80. The base member 80 is generally cylindrical in shape, and has a circular bottom wall 81 and an annular base member wall 82 welded to the bottom wall 81 at 83. A threaded base member bore 84 is provided in the bottom wall 81. The base member bore 84 may be a blind bore or a through-bore.

The mounting pad 68 also includes a threaded stud 86 having threads along its entire length. The stud 86 is sized and threaded to thread into the base member bore 84.

The mounting pad 68 also includes a support member 88. The support member 88 is generally cylindrical in shape, and includes a circular top wall 89 and an annular support member wall 90 welded to the top wall 89 at 91. The wall 90 is sized for telescopic relationship with the annular base member wall 82. More specifically, the wall 90 fits inside the wall 82. A threaded support member bore 92 is provided in the top wall 89. The support member bore 92 is sized and threaded to threadably receive the stud 86.

After the stud 86 has been threaded into the base member bore 84, the stud 86 is tack welded to the bottom wall 81 at 94, thereby fixing the stud 86 with respect to the base member 80. The base member 80 is then welded to the support surface 58 at 96, thereby fixing the stud 86 and base member 80 with respect to the support surface 58. After either the lower end of the stud 86 has been fixed with respect to the base member 80, or the base member 80 has been welded to the support surface 58, the support member 88 is threaded onto the upper end of the stud 86.

A portion of an object being supported, in this case a foot 100 of the motor 59, is then positioned on the support member 88. The motor foot 100 has an aperture 102 therethrough. The aperture 102 is of larger diameter than the diameter of the stud 86. The motor foot 100 is positioned on the support member 88 such that the stud 86 extends through the aperture 102.

Then the support member 88 is rotated to raise and lower the support member 88, and thereby adjust the distance d between the support surface 58 and the motor foot 100. Once the desired distance d between the support surface 58 and the motor foot 100 is attained, the wall 90 is welded to the wall 82 with a weld 104. The weld 104 prevents the support member 88 from rotating relative to the stud 86. Because the support member 88 may not rotate relative to the stud 86, the distance d may not be altered after weld 104 is in place (unless the weld 104 is destroyed).

After the wall 90 is welded to the wall 82, a washer 106 is placed over the stud 86 above the motor foot 100. Then a nut 110 is threaded onto the stud 86, thereby capturing the washer 106 and the motor foot 100 between the nut 110 and the support member 88. At this point, the motor foot 100 is secured a fixed distance d from the support surface 58.

Of course, the motor foot 100 or other object may be mounted a fixed distance from a support surface using variations of the steps described above. The invention is intended to provide a method using the steps described above in any order which achieves the result of the object being mounted a desired distance from the support surface.

FIGS. 7–10 illustrate a method for assembling the trolley 38. FIG. 7 illustrates a fixture 120 that supports various components of the trolley 38 during assembly. The fixture 120 includes first, second, third, and fourth wheel cradles 122, 124, 126, 128. The fixture 120 further includes first, second, third, and fourth girt supports 130, 132, 134, 136 for supporting the girt plates 48, 50 in the manner described below. The fixture 120 also includes a setup table 138 that can be used to raise and lower an object.

Referring to FIGS. 7 and 8, first, second, third, and fourth wheel assemblies 140, 142, 144, 146 are placed in the wheel cradles 122, 124, 126, 128, respectively. The wheel assemblies 140, 142, 144, 146 have respective pairs of wheel support plates 148, 150, 152, 154. The cradles 122, 124, 126, 128 are positioned so that when the wheel assemblies 140, 142, 144, 146 are resting in the wheel cradles 122, 124, 126, 128, corresponding points of the wheel assemblies 140, 142, 144, 146 (for example, either the lowest points of the wheel assemblies, or the wheel axes) together define a horizontal plane.

Figure 9:
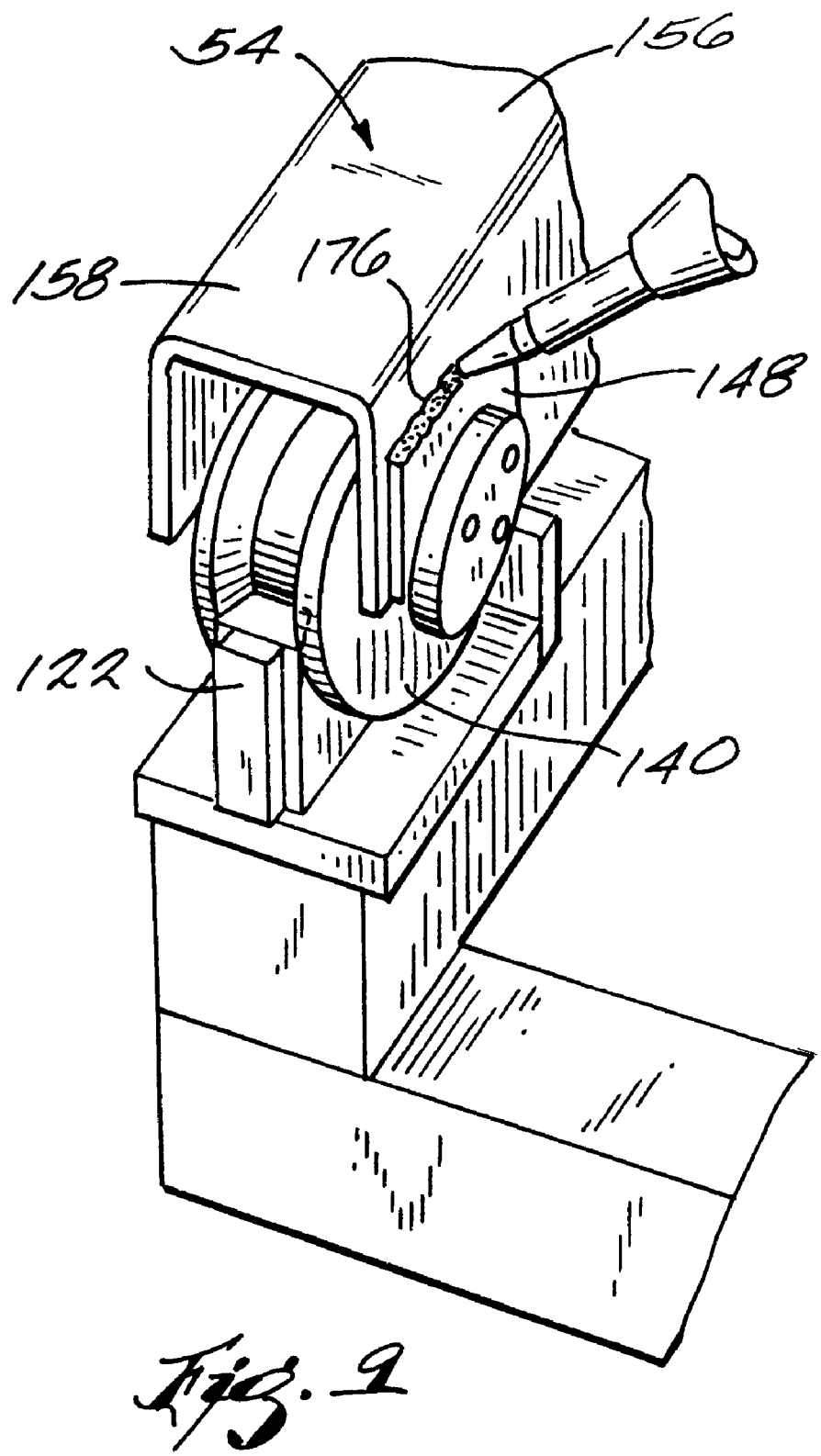
FIG. 9 is an enlarged perspective view of a wheel assembly in a cradle.

FIG. 9 illustrates the wheel assembly 140 in the wheel cradle 122, and this drawing is representative of the interaction between the cradles 122, 124, 126, 128 and the wheel assemblies 140, 142, 144, 146. The cradle 122 is machined to receive the wheel assembly 140 with close tolerances. Due to the close tolerances, movement of the wheel assembly 140 with respect to the cradle 122 during trolley assembly is minimized. Thus, the wheel assembly 140 is substantially not allowed to twist, or to move forward, backward, or to either side with respect to the cradle 122 when the wheel assembly 140 is in the cradle 122.

Referring again to FIG. 8, the trolley side 54 has an elongated tubular body 156 which has a first end 158 having a recess 159 and a second end 160 having a recess 161. The trolley side 56 likewise has an elongated tubular body 162 which has a first end 164 having a recess 165 and a second end 166 having a recess 167. While the wheel assemblies 140, 142, 144, 146 are resting in the cradles 122, 124, 126, 128, the ends 158, 160 of the trolley side 54 are positioned adjacent the wheel assemblies 140, 142, respectively, so that the wheel assemblies 140, 142 are received in the recesses 159, 161 respectively. The ends 164, 166 of the trolley side 56 are likewise positioned adjacent the wheel assemblies 144, 146, respectively, so that the wheel assemblies 144, 146 are received in the recesses 165, 167 respectively.

FIG. 9 shows the end 158 positioned adjacent the wheel assembly 140 while the wheel assembly 140 is sitting in the cradle 122. FIG. 9 is representative of the interaction between the wheel assemblies 140, 142, 144, 146 and the trolley sides 54, 56. When the end 158 of the trolley side 54 is positioned so the wheel assembly 140 is received in the recess 159 (not seen in FIG. 9), the wheel support plates 148 are located along the outside of the tubular body 156. The wheel support plates 148 are welded to the trolley side 54 with welds 176 (see FIGS. 9 and 10).

Referring to FIG. 8, first, second, third, and fourth end plates 168, 169, 170, 171 are welded to respective ends 158, 160, 164, 166 of the trolley sides 54, 56 to add structural stability to the trolley sides. The end plates 168, 169, 170, 171 may include bumpers 172, 173, 174, 175, respectively, which are best seen in FIGS. 2 and 4.

After the wheel assemblies 140, 142, 144, 146 have been welded to the trolley sides 54, 56, first and second spreader support plates 178, 180 are welded with welds 182 (see FIG. 10) to the outer surface 184 of the first trolley side 54 facing second trolley side 56. Third and fourth spreader support plates 186, 188 are welded with similar welds 182 to the outer surface 190 of the second trolley side 56 facing the first trolley side 54. The spreader support plates 178, 180, 186, 188 can be welded to the trolley sides 54, 56 in any order. The spreader support plates 178, 180, 186, 188 distribute stress over a wide area of the outer surfaces 184, 190 of the trolley sides 54, 56 when the remainder of the trolley 38 is assembled and attached to the trolley sides 54, 56 as described below. Because the trolley sides 54, 56 are comprised essentially of hollow tubes 156, 162, it is important to distribute stress over a large area to ensure structural stability.

The girt plate 48 has first and second ends 192, 194, and the girt plate 50 has first and second ends 196, 198. As seen in FIG. 7, the ends 192, 194 of the girt plate 48 are placed in the girt supports 130, 134, respectively, and the ends 196, 198 of the girt plate 50 are placed in the girt supports 132, 136, respectively. The girt plates 48, 50 are thus supported by the fixture 120 such that the front and rear girt plates 48, 50 are substantially parallel to each other and substantially perpendicular to the trolley sides 54, 56. The front and rear girt plates 48, 50 are now in position to be welded to the upper block 51 and connected to the trolley sides 54, 56.

After the girt plates 48, 50 are positioned in the fixture 120, the upper block 51 is placed on the setup table 138, and raised to the desired height between girt plates 48, 50. Then the upper block 51 is tack welded to the girt plates 48, 50. Then the upper block 51 is welded with horizontal stringer welds 200 (see FIG. 10) to the girt plates 48, 50. Then the upper block 51 is welded with vertical welds 202 (see FIG. 10) to the girt plates 48, 50.

The upper block 51 is welded to the girt plates 48, 50 in the above-described order because, of the three welds, tack welding causes the least amount of distortion. Horizontal welding causes an intermediate amount of distortion because it can be done at a relatively rapid rate, and vertical welding causes the most amount of distortion because it has to be carried out at a relatively slow rate. Therefore, when the horizontal welds 200 are carried out, there is some structural stability provided by the fixture 120 and the tack welds holding the inner assembly together. Likewise, when the vertical welds 202 are carried out, there is even more structural stability due to the horizontal welds 200 being in place. The structural stability resists distortion caused by the welds 200, 202 and allows the girt plates 48, 50 to remain substantially parallel to each other and substantially perpendicular to trolley sides 54, 56.

Figure 10:
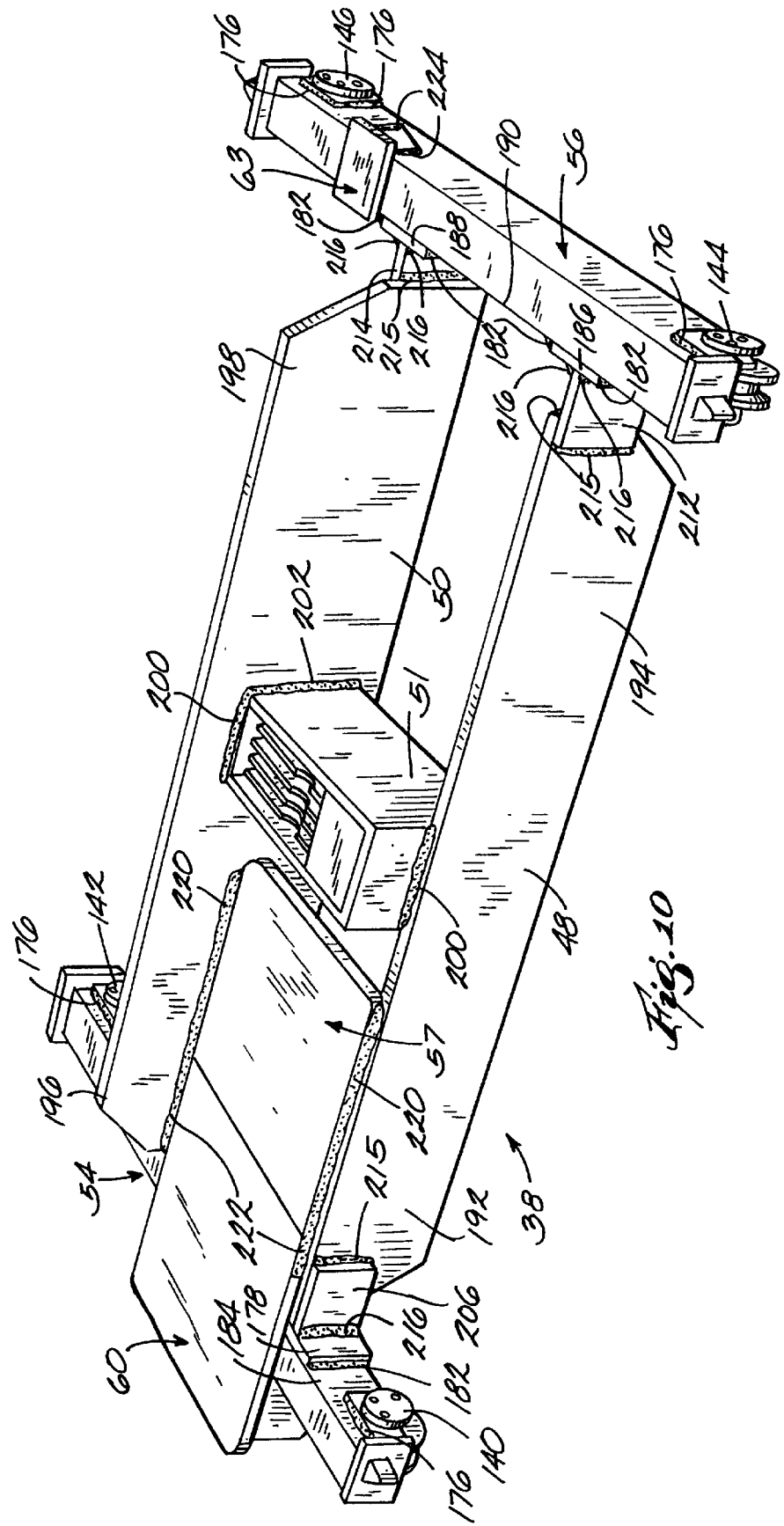
FIG. 10 is a perspective view of a partially assembled trolley.

After the inner assembly has been assembled as described above, first, second, third, and fourth plate-like support clips 206, 210, 212, 214 are welded to the respective ends 192, 196, 194, 198 of the girt plates 48, 50 with welds 215 (see FIG. 10). The support clips 206, 210, 212, 214 can be welded to the ends 192, 196, 194, 198 in any order.

Next, the support clips 206, 210, 212, 214 are joined to the spreader support plates 178, 180, 186, 188 by a series of welds 216 (see FIG. 10). The order of welds specified below is the preferred order.

First, the support clip 206 is tack welded to the spreader support plate 178, then the support clip 210 is tack welded to the spreader support plate 180, then the support clip 212 is tack welded to the spreader support plate 186, and then the support clip 214 is tack welded to the spreader support plate 188.

After the support clips 206, 210, 212, 214 have been tack welded to the spreader support plates 178, 180, 186, 188, final welds are carried out in the same order: the support clips 206, 210, 212, 214 are welded to the spreader support plates 178, 180, 186, 188, respectively and in that order.

Although the above welding sequence is preferred, the most important aspect of the above-described welding order is that the support clips 206, 210, 212, 214 are first tack welded to the spreader support plates 178, 180, 186, 188, and then, after each support clip 206, 210, 212, 214 has been tack welded to an associated spreader support plate 178, 180, 186, 188, the final welds are carried out. Therefore, the sequence in which the tack welds are carried out and the sequence in which the final welds are carried out are not as significant as having all tack welds in place prior to making the final welds.

Assembling the trolley 38 in this manner results in a low amount of distortion, as the inner assembly and fixture 120 provide structural rigidity to resist distortion caused by welding the support clips 206, 210, 212, 214 to the spreader support plates 178, 180, 186, 188. Also, the order of welding described above ensures that all support clips 206, 210, 212, 214 are tack welded to the associated spreader support plates 178, 180, 186, 188 prior to completing the welds between the support clips 206, 210, 212, 214 and spreader support plates 178, 180, 186, 188.

After the inner assembly has been joined to the trolley sides 54, 56, the base plates 57, 60, 63 can be connected to the rest of the trolley 38. As seen in FIG. 10, the motor base plate 57 is welded with welds 220 to the front and rear girt plates 48, 50. The gear case base plate 60 is welded with welds 222 to the front and rear girt plates 48, 50, and rests on the trolley side 54. The gear case base plate 60 may also be welded to the trolley side 54. The drum base plate 63 is connected to the trolley side 56 with welds 224.

The result of reducing distortion during assembly is that the wheel assemblies 140, 142, 144, 146 remain seated in the cradles 122, 124, 126, 128 from beginning to end. Because the cradles 122, 124, 126, 128 are level and properly aligned, the wheel assemblies 140, 142, 144, 146 of the assembled trolley 38 are level and properly aligned. This ensures that the wheel assemblies 140, 142, 144, 146 ride the tracks 42, 44 with each wheel contacting a corresponding track 42 or 44, and with each wheel in line with a track 42 or 44. Wear on the wheel assemblies 140, 142, 144, 146 is thereby reduced and the overall efficiency of the overhead traveling crane 10 is increased.

I claim:

1. A method for assembling a material handling trolley, the method comprising the steps of:
    (a) connecting first and second wheel assemblies to a first trolley side, and connecting third and fourth wheel assemblies to a second trolley side; and
    (b) thereafter connecting an inner assembly weldment to the first and second trolley sides.

2. The method of claim 1, wherein the first trolley side has first and second ends, and the second trolley side has first and second ends, and wherein step (a) further comprises the steps of:
    positioning the first and second ends of the first trolley side adjacent the first and second wheel assemblies, respectively;
    positioning the first and second ends of the second trolley side adjacent the third and fourth wheel assemblies, respectively; and
    welding the first wheel assembly to the first trolley side adjacent the first end thereof, welding the second wheel assembly to the first trolley side adjacent the second end thereof, welding the third wheel assembly to the second trolley side adjacent the first end thereof, and welding the fourth wheel assembly to the second trolley side adjacent the second end thereof.

3. The method of claim 1, wherein the inner assembly weldment includes a first girt plate having first and second ends, and a second girt plate having first and second ends, the second girt plate being connected to the first girt plate, and wherein step (b) further comprises the steps of:
    (c) welding a first support clip to the first end of the first girt plate, welding a second support clip to the first end of the second girt plate, welding a third support clip to the second end of the second girt plate, and welding a fourth support clip to the second end of the first girt plate;
    (d) welding first and second support plates to the first trolley side, and welding third and fourth support plates to the second trolley side; and
    (e) welding the first, second, third, and fourth support clips to the first, second, third, and fourth support plates, respectively.

4. The method of claim 3, wherein step (e) further comprises the steps of:
    tack welding the first support clip to the first support plate, then tack welding the second support clip to the second support plate, then tack welding the third support clip to the third support plate, and then tack welding the fourth support clip to the fourth support plate; and then
    welding the first support clip to the first support plate, then welding the second support clip to the second support plate, then welding the third support clip to the third support plate, and then welding the fourth support clip to the fourth support plate.

5. A method for assembling a material handling trolley, said method comprising the steps of:
    (a) setting first, second, third, and fourth wheel assemblies into first, second, third, and fourth wheel cradles, respectively, the wheel cradles defining a horizontal plane;
    (b) then connecting a first trolley side to the first and second wheel assemblies, and connecting a second trolley side to the third and fourth wheel assemblies; and
    (c) then connecting an inner assembly weldment to the trolley sides.

6. The method of claim 5, wherein the first trolley side has first and second ends and the second trolley side has first and second ends, and wherein step (b) further comprises the steps of:
    positioning the first and second ends of the first trolley side adjacent the first and second wheel assemblies, respectively;
    positioning the first and second ends of the second trolley side adjacent the third and fourth wheel assemblies, respectively; and then
    welding the first wheel assembly to the first trolley side adjacent the first end thereof, welding the second wheel assembly to the first trolley side adjacent the second end thereof, welding the third wheel assembly to the second trolley side adjacent the first end thereof, and welding the fourth wheel assembly to the second trolley side adjacent the second end thereof.

7. The method of claim 5, wherein the inner assembly weldment includes a first girt plate having first and second ends, and a second girt plate having first and second ends, the second girt plate being connected to the first girt plate, and wherein step (c) further comprises the steps of:
    (d) welding a first support clip to the first end of the first girt plate, welding a second support clip to the first end of the second girt plate, welding a third support clip to the second end of the second girt plate, and welding a fourth support clip to the second end of the first girt plate;
    (e) welding first and second support plates to the first trolley side, and welding third and fourth support plates to the second trolley side; and
    (f) welding the first, second, third, and fourth support clips to the first, second, third, and fourth support plates, respectively.

8. The method of claim 7, wherein step (f) further comprises the steps of:
    tack welding the first support clip to the first support plate, then tack welding the second support clip to the second support plate, then tack welding the third support clip to the third support plate, and then tack welding the fourth support clip to the fourth support plate; and then welding the first support clip to the first support plate, then welding the second support clip to the second support plate, then welding the third support clip to the third support plate, and then welding the fourth support clip to the fourth support plate.

9. A method for assembling a material handling trolley, said method comprising the steps of:

(a) providing first, second, third, and fourth wheel assemblies;

(b) providing a fixture, the fixture including:
first, second, third, and fourth wheel cradles, the wheel cradles defining a horizontal plane; and
a setup table;

(c) setting the first, second, third, and fourth wheel assemblies into the first, second, third, and fourth wheel cradles, respectively;

(d) providing a first trolley side including an elongated tube portion, and having first and second ends;

(e) providing a second trolley side including an elongated tube portion, and having first and second ends;

(f) positioning the first and second ends of the first trolley side adjacent the first and second wheel assemblies, respectively;

(g) positioning the first and second ends of the second trolley side adjacent the third and fourth wheel assemblies, respectively;

(h) after step (f), welding the first wheel assembly to the first trolley side adjacent the first end thereof, and welding the second wheel assembly to the first trolley side adjacent the second end thereof, and after step (g), welding the third wheel assembly to the second trolley side adjacent the first end thereof, and welding the fourth wheel assembly to the second trolley side adjacent the second end thereof;

(i) welding first and second spreader support plates to the first trolley side, and welding third and fourth spreader support plates to the second trolley side;

(j) providing a rear girt plate having first and second ends;

(k) providing a front girt plate having first and second ends;

(l) supporting the rear girt plate, with the fixture, generally perpendicular to the trolley sides;

(m) supporting the front girt plate, with the fixture, generally perpendicular to the trolley sides;

(n) positioning an upper block on the setup table;

(o) after step (n), raising the setup table, and thereby the upper block, to a selected height;

(p) after step (o), tack welding the upper block to the front girt plate and to the rear girt plate;

(q) after step (p), welding, with horizontal welds, the upper block to both the front and rear girt plates;

(r) after step (q), welding, with vertical welds, the upper block to both the front and rear girt plates;

(s) providing first, second, third, and fourth support clips;

(t) welding the first support clip to the first end of the front girt plate, welding the second support clip to the first end of the rear girt plate, welding the third support clip to the second end of the rear girt plate, and welding the fourth support clip to the second end of the front girt plate;

(u) after steps (r) and (t), tack welding the first support clip to the first spreader support plate, then tack welding the second support clip to the second spreader support plate, then tack welding the third support clip to the third spreader support plate, and then tack welding the fourth support clip to the fourth spreader support plate; and (v) after step (u), welding the first support clip to the first spreader support plate, then welding the second support clip to the second spreader support plate, then welding the third support clip to the third spreader support plate, and then welding the fourth support clip to the fourth spreader support plate.

* * * * *